May 21, 1935.  J. W. LAKIN  2,001,787
LATCH
Filed May 10, 1933
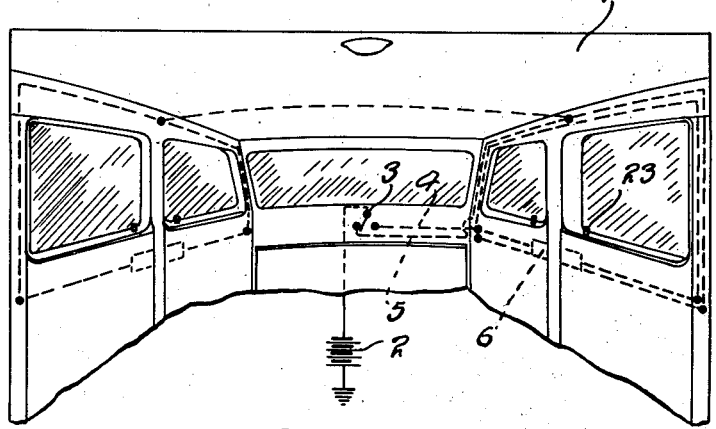
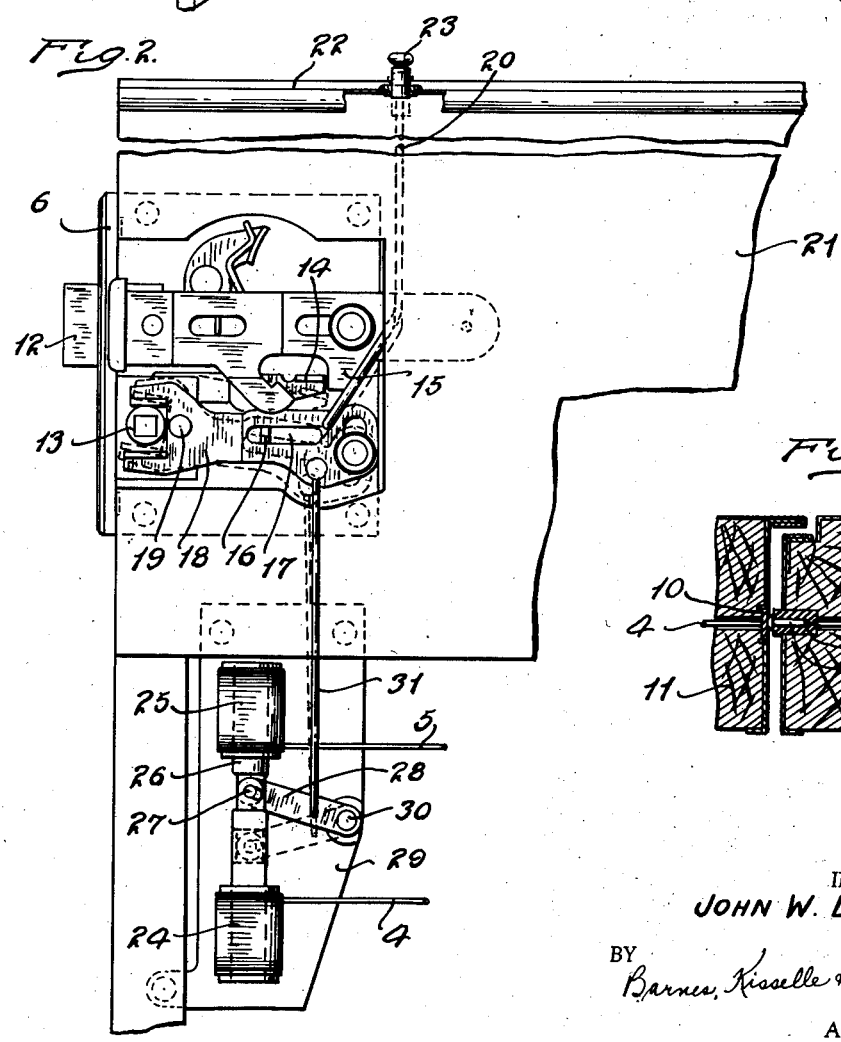
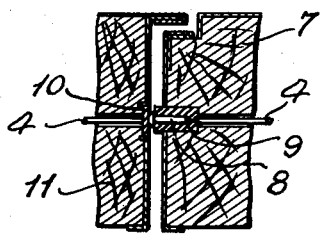
INVENTOR.
JOHN W. LAKIN.
BY
 Barnes, Kisselle & Laughlin
ATTORNEYS.

Patented May 21, 1935

2,001,787

UNITED STATES PATENT OFFICE 2,001,787

LATCH

John W. Lakin, Detroit, Mich., assignor to Ternstedt Manufacturing Company, Detroit, Mich., a corporation of Michigan Application May 10, 1933, Serial No. 670,254

3 Claims. (Cl. 70—50)

In latches, and more particularly a latch for the door of an automotive vehicle, it is old to lock the latch or the outside retractor, that is, to prevent retraction of the bolt when in projected position, by several equivalent ways. This may be achieved in several ways all of which are called "locking the outside retractor", such as by positively dogging the outside retractor or by disconnecting the retractor from the bolt so that operation of the outside retractor is ineffective to retract the bolt. This locking of the outside retractor may be effected from an adjacent or a remote point through mechanical or electrical means with a switch or other control device located at some convenient place such as upon the instrument board. With this type of latch it is desirable to have some visible means for notifying the operator that the outside retractor has been locked to avoid the necessity of the operator actually getting out of the vehicle and trying the outside retractor to make sure that it is locked. The utility of a tell-tale is particularly great when this type of latch is used in a mechanical or electrical coincidental locking system because obviously it is desirable that the operator be given some definite visible assurance that all of the latches have been locked to avoid the necessity of trying each of the outside retractors individually. Also with this type of latch the locking means for the locking of the outside retractor may break down thus making it desirable to provide an emergency device for locking or unlocking the outside retractor. Hence, it is an object of this invention to overcome the above mentioned difficulties both in single locks and in coincidental locking systems by providing the above mentioned type of latch with a tell-tale which serves also as an emergency device for locking or unlocking the outside retractor.

In the drawing:

Fig. 1 is a schematic view of the inside of an automobile showing a coincidental locking system lay out.

Fig. 2 is a detail elevation of the lock.

Fig. 3 is a detail showing a pillar contact.

Referring more particularly to the drawing there is shown in Figure 1 an interior view of a vehicle body 1. In this specific lay-out the battery 2 is connected to a two-way switch 3 which controls both the locking circuit 4 and unlocking circuit 5. The locking and unlocking circuits 4 and 5 are connected with the latch generally designated 6. The wire of the locking circuit 4 passes from the switch 3 along the back of the instrument board to a contact button 8 mounted in the rubber block 9 in the windshield pillar 7. The contact button 8 is arranged to contact with the contact plate 10 in the door pillar 11, which contact plate is connected to the locking wire extending across the door to the latch 6. As shown, the wires of the locking circuit for the rear door latch pass upwardly along the right windshield pillar to the top and then along the top to the rear body hinge pillar where a contact through the hinge pillar, similar to that shown in Figure 3, is made and then the wire passes across the door to the rear door lock. A similar wiring is used for the unlocking circuit 5. A similar locking and unlocking circuit set-up is used on the left side of the body. The current for both the locking and unlocking circuits on the left hand side of the body is provided by connecting the locking and unlocking circuits on the left with those on the right by means of wires which extend across the top of the body as shown.

It is understood that the above electrical coincidental locking system is set forth, by way of example only, as one of the systems for which the latch 6 is adapted. The mechanical features of the latch 6 are shown and described in copending application of Andrew C. Anderson and Benjamin H. Bowlus Serial No. 638,856, filed October 21, 1932, and hence will not be described in detail. Generally the latch 6 comprises a reciprocable bolt 12 provided with an outside rollback 13 which can be turned by the usual outside door handle. The rollback 13 instead of operating directly upon the reciprocable bolt 12 acts through a link 14, which is arranged to be engaged with, or disengaged from, the abutment 15 here shown as an integral part of the bolt 12. The link 14 is provided with a lug 16 which slidably engages the slot 17 in the lever 18 pivoted as at 19. The lever 18 may be pivoted by the push rod 20 which extends upwardly along the lock board 21 through the garnish molding 22 terminating in a button 23. When the button 23 is raised to the position shown in the full lines, the lever 18 is pivoted counter-clockwise about the pivot 19 thus, through the engagement of the lug 16 in the slot 17, swinging the link 14 into abutting engagement with the abutment 15 whereby manipulation of the outside handle turns the rollback 13 and retracts the bolt 12. If the push button 23 is pressed downwardly to the position shown in the dotted lines in a similar fashion, the link 14 is disengaged from the abutment 15 thus rendering the outside rollback ineffective to retract the bolt 12.

It is proposed to lock and unlock the latch 6 and by way of example this may be done electrically by means of the locking and unlocking solenoids 24 and 25 respectively, which are connected to the locking and unlocking circuits 4 and 5 respectively. The solenoids 24 and 25 are provided with an armature 26 which has pivoted thereto with a lost motion connection, as at 27, a lever 28 which is pivoted to the support plate 29 as at 30. The lever 28 is connected to the lever 18 by the link 31. Both the battery and the solenoids are grounded on the body thus completing the circuit.

As herein shown the latch 6 is part of a coincidental locking system for an automotive vehicle, but it is understood that if desired the latch can be used singly since in either event the push button 23 serves both as a tell-tale and as an emergency device for releasing and locking the outside retractor.

In operation, if the operator desires to lock the doors so that manipulation of the outside retractors is either impossible or ineffective to retract the bolts 12, the two-way switch 3 is turned so that the battery is connected to the locking circuit 4 whereupon the solenoid 24 draws the armature 26 to the position shown in the dotted lines and thus causes the lever 28 through link 31 and lever 18 to draw the link 14 to the position shown in the dotted lines where it is disconnected from the abutment 15, and at the same time the rod 20 and push button 23 are depressed to the position shown in the dotted lines. After the switch 3 has been manipulated the push buttons 23 on the several doors serve as tell-tales and indicate to the operator at a glance whether the locking mechanism of each of the latches has been placed in locking position thus obviating the necessity for the operator to get out of the car and try each of the outside door handles separately to determine whether or not the latches have been locked. If the operator desires to unlock the locks he turns the switch 3 so that the battery is connected with the unlocking circuit 5 whereupon the solenoid 25 draws the armature 26 to the position shown in the full lines. The armature operating through lever 28, link 31, and lever 18, places link 14 in operative connection with the abutment 15 and at the same time pushes the rod 20 and push button 23 upwardly to the position shown in the full lines where again a glance of the operator at the push button 23 of each lock will tell him instantly whether the latches are unlocked and capable of operation from the outside of the vehicle. In the event that anything goes wrong with the coincidental locking system any latch may still be locked or unlocked by manual manipulation of the push button 23.

I claim:

1. In a latch the combination of a retractable latch bolt, an outside retractor for the bolt, means for locking the outside retractor, manually operable means for actuating the first mentioned means and for indicating that the outside retractor is locked, independent means operatively connected to said manually operable means for actuating both the first mentioned means and the manually operable indicating means, and a control device for controlling the independent means whereby the independent means may be actuated to lock the outside retractor and to set the indicating means.

2. In a latch for a vehicle body door the combination of a retractable latch bolt, an outside retractor for the bolt, means for locking the outside retractor, visible manually operable means for actuating the first mentioned means and for indicating that the outside retractor is locked, electromagnetic means operatively connected to said manually operable means for actuating both the first mentioned means and the indicating means, and a control switch positioned within the body at a point remote from the electro-magnetic means for controlling both the electro-magnetic means and the indicating means, the said indicating means serving as a tell-tale and as an auxiliary device for mechanically operating the first mentioned means.

3. A latch for a door of a vehicle body comprising in combination a retractable latch bolt, an outside retractor for the bolt, means for locking the outside retractor, visible means for actuating the first mentioned means and manually operable from the inside of the door for indicating that the outside retractor is locked, independent means operatively connected to the said manually operable means for actuating both the first mentioned means and the manually operable indicating means, and a control device operable from the inside of the vehicle body for controlling the independent means whereby the independent means may be actuated to lock the outside retractor and to set the indicating means.

JOHN W. LAKIN.